US011984682B2

(12) United States Patent
Chae et al.

(10) Patent No.: US 11,984,682 B2
(45) Date of Patent: May 14, 2024

(54) CONNECTOR ASSEMBLY

(71) Applicants: HYUNDAI MOTOR COMPANY, Seoul (KR); KIA CORPORATION, Seoul (KR)

(72) Inventors: Eul-Yong Chae, Seoul (KR); Min-Gun Jeong, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 175 days.

(21) Appl. No.: 17/715,785

(22) Filed: Apr. 7, 2022

(65) Prior Publication Data

US 2023/0170638 A1 Jun. 1, 2023

(30) Foreign Application Priority Data

Nov. 26, 2021 (KR) ........................ 10-2021-0165821

(51) Int. Cl.
*H01R 13/11* (2006.01)
*H01R 4/48* (2006.01)
*H01R 13/627* (2006.01)
*H01R 13/642* (2006.01)

(52) U.S. Cl.
CPC ........... *H01R 13/11* (2013.01); *H01R 4/4863* (2013.01); *H01R 13/6272* (2013.01); *H01R 13/642* (2013.01)

(58) Field of Classification Search
CPC .. H01R 13/11; H01R 13/642; H01R 13/6272; H01R 13/10
USPC .......................................................... 439/157
See application file for complete search history.

(56) References Cited

U.S. PATENT DOCUMENTS

| | | | | |
|---|---|---|---|---|
| 4,655,526 A * | 4/1987 | Shaffer | H01R 12/87 | 439/923 |
| 5,489,216 A * | 2/1996 | Matsushita | H01R 12/721 | 439/260 |
| 5,893,772 A * | 4/1999 | Carmo | H01R 13/639 | 439/348 |
| 6,149,468 A * | 11/2000 | Meng | H01R 12/82 | 439/637 |
| 6,855,891 B2 * | 2/2005 | Eguchi | H01R 12/721 | 174/250 |

(Continued)

FOREIGN PATENT DOCUMENTS

| | | |
|---|---|---|
| JP | 2013187166 A | 9/2013 |
| JP | 2013187169 A | 9/2013 |
| KR | 101470280 B1 | 12/2014 |

*Primary Examiner* — Harshad C Patel
(74) *Attorney, Agent, or Firm* — Lempia Summerfield Katz LLC

(57) ABSTRACT

A connector assembly includes a female connector having a pair of female terminals inserted into a housing of which one side is open, and including a male connector having a male terminal inserted between the pair of female terminals to come into contact with the pair of female terminals. one end of a female terminal of the pair of female terminals is fixed to an inner surface of the housing. The other end thereof is disposed to extend by a predetermined length. A displacement of the other end occurs toward the one end due to the configuration of the male connector. A contact defect problem during coupling does not occur and reworking of the connector assembly is facilitated.

17 Claims, 4 Drawing Sheets

(56) References Cited

U.S. PATENT DOCUMENTS

| | | | | |
|---|---|---|---|---|
| 7,347,708 | B1 * | 3/2008 | Huang | H01R 13/639 439/263 |
| 7,484,986 | B1 * | 2/2009 | Wu | H01R 13/6275 439/346 |
| 7,628,654 | B2 * | 12/2009 | Hori | H01R 13/5205 439/637 |
| 7,699,666 | B2 * | 4/2010 | Hohne | H01H 1/50 439/700 |
| 8,382,507 | B2 * | 2/2013 | Yamaguchi | H01R 13/6275 439/369 |
| 8,998,657 | B1 * | 4/2015 | Von Eckroth | H01R 13/113 439/810 |
| 9,033,741 | B2 * | 5/2015 | Su | H01R 33/0854 439/612 |
| 9,054,447 | B1 * | 6/2015 | Czarnecki | H01R 13/53 |
| 9,548,574 | B2 * | 1/2017 | Hsu | H01R 13/7038 |
| 9,559,467 | B1 * | 1/2017 | Khorrami | H01R 13/6581 |
| 10,714,862 | B1 * | 7/2020 | Yu | H01R 13/20 |
| 11,688,966 | B1 * | 6/2023 | Shen | H01R 13/193 439/372 |
| 2003/0040219 | A1 * | 2/2003 | Lin | H01R 24/50 439/578 |
| 2016/0028193 | A1 * | 1/2016 | Du | G01R 31/68 324/538 |
| 2018/0109029 | A1 * | 4/2018 | Brantingham | H01R 13/5208 |

* cited by examiner

CONNECTOR ASSEMBLY

CROSS-REFERENCE(S) TO RELATED APPLICATIONS

This application claims priority to Korean Patent Application No. 10-2021-0165821, filed on Nov. 26, 2021, which is incorporated herein by reference in its entirety.

BACKGROUND OF PRESENT DISCLOSURE

Technical Field

Embodiments of the present disclosure relate to a connector assembly including a female connector and a male connector.

Description of Related Art

A connector assembly transmits a signal due to a contact point bonding between terminals of a female connector and a male connector.

Most connector devices transmit electrical signals as a copper alloy of the female terminal, having a spring characteristic, comes into contact with a copper alloy of the male terminal.

However, under severe durability conditions (an impact, a vibration, heat, and the like), the copper alloy of the female terminal is plastically deformed resulting in an unstable contact, and further resulting in a frequent increase in contact resistance.

In addition, since it is difficult to manage a tolerance of the terminal, when the connector is engaged, the plated terminal is easily worn. Thus, worn debris acts as a factor of increasing contact resistance (fretting wear).

Therefore, quality problems related to the fretting wear occur frequently and a lot of quality costs occur due to recall costs related to parts.

In particular, a failure that occurs in the high voltage connector may lead to a vehicle fire. In order to solve the problem, various connector structures have been proposed.

However, variously proposed structures improve coupling durability, but have difficulty in re-engagement in the case of reworking, connector reworking, and the like.

The contents described in the above Description of Related Art are to aid in understanding the background of the present disclosure. The contents thus may include what is not previously known to those having ordinary skill in the art to which the present disclosure pertains.

SUMMARY OF PRESENT DISCLOSURE

An embodiment of the present disclosure is directed to a connector assembly that does not cause poor contact problems during coupling and that facilitates reworking.

Other objects and advantages of the present disclosure can be understood by the following description and should become apparent with reference to the embodiments of the present disclosure. Also, it should be apparent to those having ordinary skill in the art to which the present disclosure pertains that the objects and advantages of the present disclosure can be realized by the means as claimed and combinations thereof.

In accordance with an embodiment of the present disclosure, a connector assembly is provided that includes: a female connector having a pair of female terminals inserted into a housing of which one side is open (e.g., an open side);

and a male connector including a male terminal inserted between the pair of female terminals to come into contact with the pair of female terminals. Further, one end of a female terminal of the pair of female terminals is fixed to an inner surface of the housing, the other end thereof is disposed to extend by a predetermined length, and a displacement of the other end occurs toward the one end due to the male connector.

In addition, the male connector may further include a male terminal guide configured to surround an outer circumference of the male terminal. When the male connector is inserted into the housing, the male terminal guide may press the other end of the female terminal.

In addition, when the male connector is inserted into the housing, the male terminal guide may be in surface contact with the other end of the female terminal.

In addition, the female terminal may be a coil spring with peaks and valleys which are connected at regular intervals.

In addition, when no external force is applied, an interval between the pair of female terminals may be less than or equal to a height difference h between the peak and the valley.

Here, when no external force is applied, a width of the male terminal may be less than or equal to a height difference h between the peak and the valley.

Alternatively, when no external force is applied, a width of the male terminal guide may be less than or equal to a height difference h between the peak and the valley.

Alternatively, a length from an end of the male terminal to the male terminal guide may be smaller than a length of the female terminal when no external force is applied.

Alternatively, in a state in which the male connector and the female connector are coupled to one another, when no external force is applied, an interval between the peak and the valley may be greater than or equal to ¼ and less than or equal to ½ of an interval between the peak and the valley of the female terminal.

In addition, in a state in which the male connector and the female connector are coupled to one another, a length of the female terminal may be less than or equal to ½ of the length of the female terminal when no external force is applied.

Meanwhile, the connector assembly may further include a release prevention lever that is hinge-coupled to an inner surface of a lever hole formed in a side surface of the housing and of which an inner portion and an outer portion form a predetermined angle.

In addition, the inner portion may be disposed in an inner space of the housing when no external force is applied. When the male connector is inserted into the housing, the male terminal guide may push the inner portion to pivot the inner portion.

In addition, when the male terminal and the female terminal are engaged, the release prevention lever may be restored due to its restoring force to a position of when no external force is applied. Also, the inner portion may block the male terminal guide from being moved backward.

In addition, when the male terminal and the female terminal are engaged, the outer portion may be exposed to an outside of the housing through the lever hole so that a rotational operation of the release prevention lever may be performed when the outer portion is manipulated.

In accordance with another embodiment of the present disclosure, a connector assembly is provided that includes: a female connector having a pair of female terminals inserted into a housing of which one side is open; a male connector including a male terminal inserted between the pair of female terminals to come into contact with the pair of female terminals, and a male terminal guide configured to surround an outer circumference of the male terminal; and a release prevention lever hinge-coupled to an inner surface of a lever hole formed in a side surface of the housing. The release prevention hinge is configured to prevent the male terminal guide from being moved backward when the male terminal and a female terminal of the pair of female terminals are engaged. One end of the female terminal is fixed to an inner surface of the housing, and the other end thereof is disposed to extend by a predetermined length. Further, when the male connector is inserted into the housing, the male terminal guide presses the other end of the female terminal so that a displacement of the other end occurs toward the one end.

Alternatively, a length from an end of the male terminal to the male terminal guide may be smaller than a length of the female terminal when no external force is applied.

When the male terminal and the female terminal are engaged, the length of the female terminal may be less than or equal to ½ of a length of the female terminal when no external force is applied.

In addition, the release prevention lever may include an inner portion of which one end portion is disposed in an inner space of the housing and coupled to a lever pin coupled to an inner surface of the lever hole when no external force is applied. Further, the release prevention lever may include an outer portion that maintains a predetermined angle with the inner portion and of which one end portion is coupled to the lever pin. The release prevention lever is pivoted about the lever pin and is elastically restored due to an elastic spring coupled in the housing.

DESCRIPTION OF SPECIFIC EMBODIMENTS

In order to fully understand the present disclosure, operational advantages of the present disclosure, and objects attained by practicing the present disclosure, reference should be made to the accompanying drawings that illustrate embodiments of the present disclosure and to the description referring to the accompanying drawings.

In describing embodiments of the present disclosure, the description for publicly-known technologies or repeated descriptions have been reduced or omitted to avoid unnecessarily obscuring the gist of the present disclosure.

Figure 1:
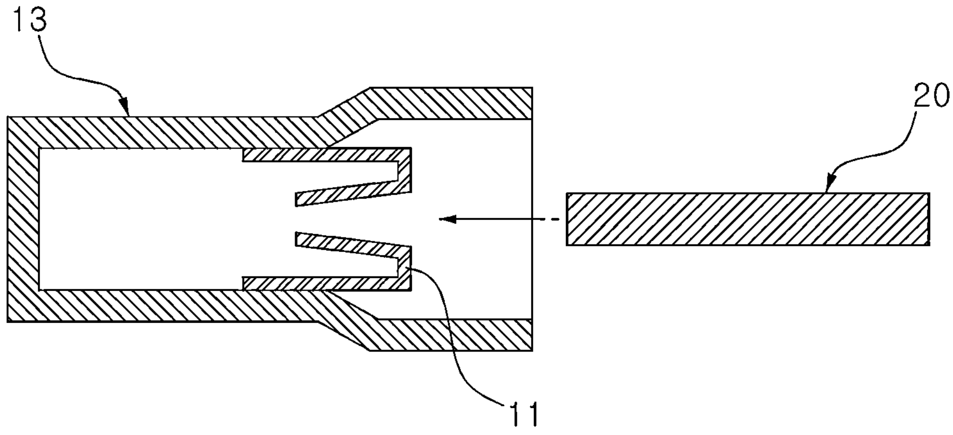
FIG. 1 PRIOR ART
FIGS. 1 and 2 are diagrams illustrating a conventional connector of the related art.
Figure 2:
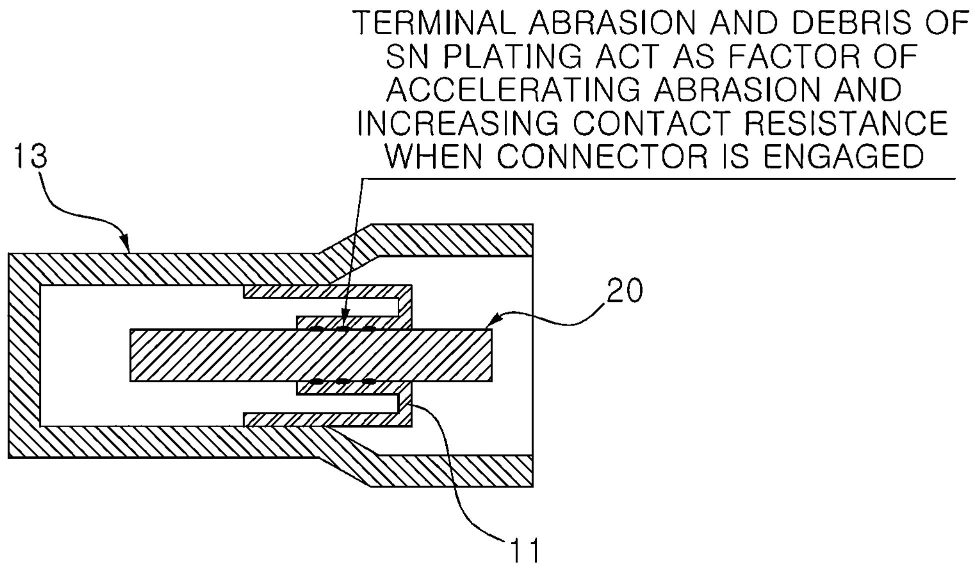
FIG. 2 PRIOR ART
Figure 3:
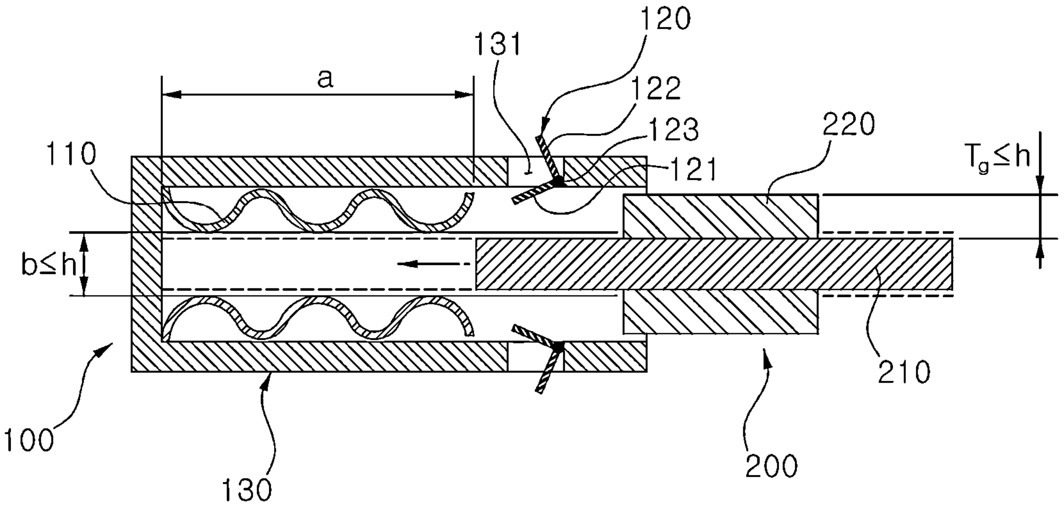
FIG. 3 is a schematic diagram illustrating a connector assembly of the present disclosure.
Figure 4:
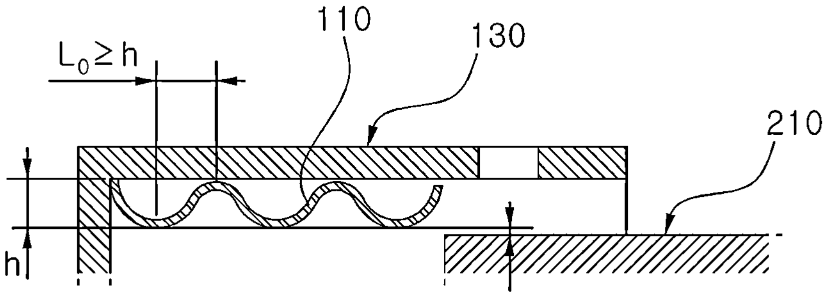
FIG. 4 is a diagram illustrating a portion of FIG. 3.

FIGS. 1 and 2 are diagrams illustrating a conventional connector. In addition, FIG. 3 is a schematic diagram illustrating a connector assembly of the present disclosure and FIG. 4 is a diagram illustrating a portion of FIG. 3.

Hereinafter, a connector assembly according to one embodiment of the present disclosure is described with reference to FIGS. 1-4.

As shown in FIGS. 1 and 2, a conventional connector has a structure in which a male terminal 20 is engaged with a pair of female terminals 11 in a housing 13. The performance degradation of the connector occurs due to fretting wear and deformation of a tin (Sn) plating using a structure in which a contact occurs after the engagement.

When the connector is engaged, a Sn plating portion is worn, and Sn debris acts as a factor in increasing contact resistance of a contact portion. The Sn plating portion is deformed over time so that the contact resistance is increased.

A quality problem occurs continuously, in which a tolerance for a contact between the male terminal 20 and the female terminal 11 is difficult to manage. Also, terminal deformation is accelerated after reworking, which is likely to cause various quality problems.

An object of the present disclosure is to change structures of female and male terminals of a connector using a copper alloy having a high spring characteristic. Wear and deformation of contact portions of the female and male terminals is thereby prevented and low resistance of the female and male terminals is thereby maintained.

The connector assembly of the present disclosure includes a female connector 100 and a male connector 200. The female connector 100 includes a female terminal 110 inserted in a housing 130 and a release prevention lever 120 formed in a side surface of the housing 130.

In addition, the male connector 200 includes a male terminal 210 and a male terminal guide 220.

The housing 130 may be of a cylindrical shape and a rectangular parallelepiped type. In addition, one side of the housing 130 is open, and an inside thereof is empty so that a male connector 200 may be inserted into the inside thereof.

The female terminal 110 is provided as a pair of female terminals 110. One end portion of each of the pair of female terminals 110 is fixed to an inner surface adjacent to a closed surface opposite to an open surface of the housing 130 The other end portion thereof is provided to extend by a predetermined length a.

The female terminal 110 may be made of a copper alloy material, may be elastically deformed, and may have an elastic modulus determined according to usage.

Alternatively, the female terminal 110 may be made of beryllium copper, phosphor bronze, or a corson alloy. The female terminal 110 may be made of a metal material (e.g., steel use stainless (SUS) or tungsten) which is capable of being plated.

Alternatively, a material with less plastic deformation and a low value of stress relaxation characteristic (%) may be used.

As shown in the drawing, the female terminal 110 may be a coil spring in which peaks (e.g., summits) and valleys are repeatedly connected at regular intervals or may be in the form of a leaf spring. Further, a height difference h between the peak and the valley may be less than or equal to a distance L0 between the peak and the valley.

In addition, in a steady state in which no external force is applied, a distance b between the pair of female terminals 110 is less than or equal to the height difference h between the peak and the valley.

In addition, the male terminal 210 may be in the form of a bar or a rod. The male terminal guide 220 is formed to surround an outer circumference of the male terminal 210.

The male terminal 210 is inserted into a space between the pair of female terminals 110. Additionally, a width of the male terminal 210 is less than or equal to the height difference h between the peak and the valley before the insertion.

Thus, the male terminal 210 is inserted into the space between the pair of female terminals 110. The male terminal guide 220 around the male terminal 210 is inserted while pressing one end of the female terminal 110.

In other words, the width of the male terminal 210 is less than or equal to the height difference h between the peak and the valley before the insertion. Therefore, as shown in FIG. 4, the male terminal 210 is formed to be spaced apart from the peak of the female terminal 110 before the insertion.

In addition, since a width Tg of the male terminal guide 220 is less than or equal to the height difference h between the peak and the valley, the male terminal guide 220 presses the female terminal 110 while being inserted into the housing 130.

To this end, a length from an end of the male terminal 210 to the male terminal guide 220 is formed to be smaller than the length a, of the female terminal 110 before the deformation. Therefore, when the male terminal 210 is inserted, the male terminal guide 220 presses the female terminal 110.

In addition, the release prevention lever 120 is hinge-coupled to a lever pin 123 that is coupled to an inner surface of a lever hole 131 and is formed in a side surface of the housing 130 out of a position where the female terminal 110 is disposed.

As shown in the drawings, in the form in which an inner portion 121 and an outer portion 122 are combined at a predetermined inclination (e.g., predetermined angle), before the male terminal 210 is inserted, the inner portion 121 is disposed in an inner space of the housing 130.

Therefore, when the male terminal 210 is inserted, the male terminal guide 220 pushes the inner portion 121 so that the release prevention lever 120 is pivoted about the lever pin 123.

In order to maintain a shape before the insertion, an elastic spring may be coupled to the release prevention lever 120. Further, the inner portion 121 and the outer portion 122 maintain an angle approximate to 90 degrees so that the outer portion 122 is in a state of being disposed to protrude from an outer surface of the housing 130.

FIGS. 5-8 are diagrams sequentially illustrating an operating state of the connector assembly of the present disclosure.

Figure 5:
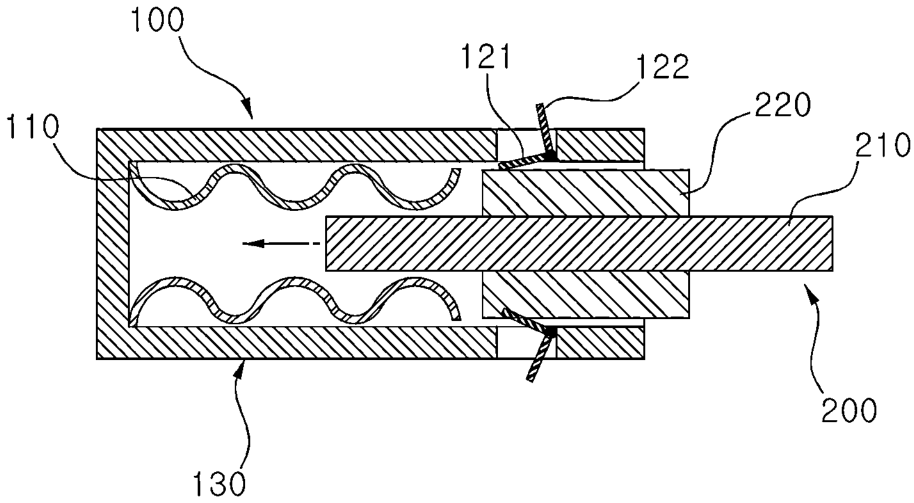
FIGS. 5-8 are diagrams sequentially illustrating an operating state of the connector assembly of the present disclosure.

As shown in FIG. 5, when the male connector 200 is inserted into the housing 130 of the female connector 100 in a state before the insertion of the male terminal 210, as shown in FIG. 3, the male terminal 210 enters between the pair of female terminals 110. In this case, the male terminal guide 220 pushes the inner portion 121 of the release prevention lever 120 to pivot the release prevention lever 120 about the lever pin 123.

Figure 6:
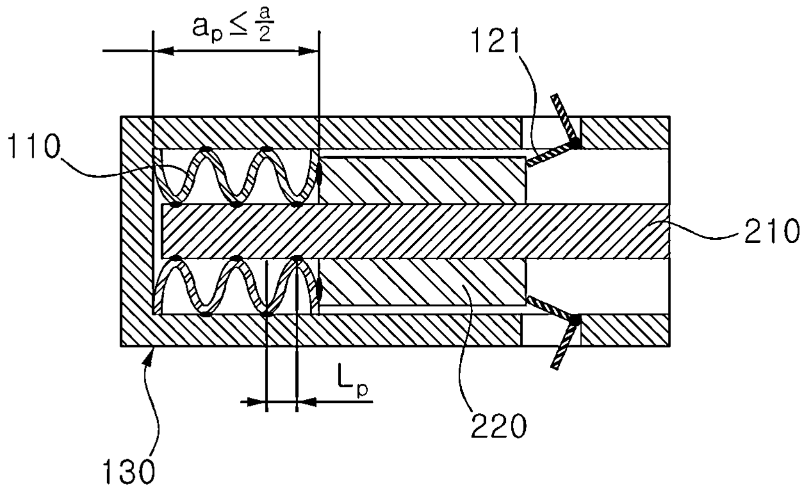

Thereafter, the male terminal 210 is further advanced and is fully engaged as shown in FIG. 6.

In other words, the male terminal guide 220 pushes the other end portion of the female terminal 110 to generate a displacement so that the female terminal 110 is compressed.

In this case, the release prevention lever 120 is elastically restored and pivoted in a reverse direction, so that the inner portion 121 is located in the inner space of the housing 130 to support a rear end of the male terminal guide 220 and block a backward operation of the male terminal guide 220.

In addition, since the female terminal 110 is compressed, the peaks of the female terminal 110 come into contact with a side surface of the male terminal 210. Thus, the valleys of the female terminal 110 come into contact with an inner surface of the housing 130. The other end portion of the female terminal 110 comes into contact with a front end of the male terminal guide 220.

In other words, ten or more point contacts and two or more surface contacts may be possible.

As shown in FIG. 6, in a state in which the female terminal 110 is compressed, an interval $L_p$ between the peak and the valley may be less than or equal to $L_0/2$ and greater than or equal to $L_0/4$.

In other words, when an $L_p$ value is greater than $L_0/2$, an unstable contact point may be formed because the female terminal 110 is not folded at a desired curvature. When the $L_p$ value is less than $L_0/4$, an increase in fretting wear and contact resistance may occur due to a floating of the contact point.

In addition, for the same reason, in a state in which the female terminal 110 is compressed, a length $a_p$ of the female terminal 110 may be less than or equal to a/2.

Figure 7:
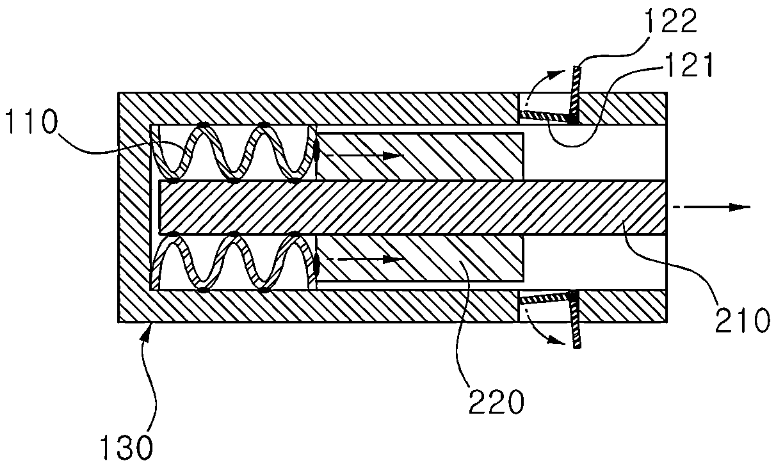

After the above engagement, it is possible to operate the outer portion 122 of the release prevention lever 120 for reworking. In other words, as shown in FIG. 7, by pivoting the outer portion 122 of the release prevention lever 120, that is exposed to the outside of the housing 130, it is possible to release the male terminal guide 220 from the inner portion 121.

Figure 8:
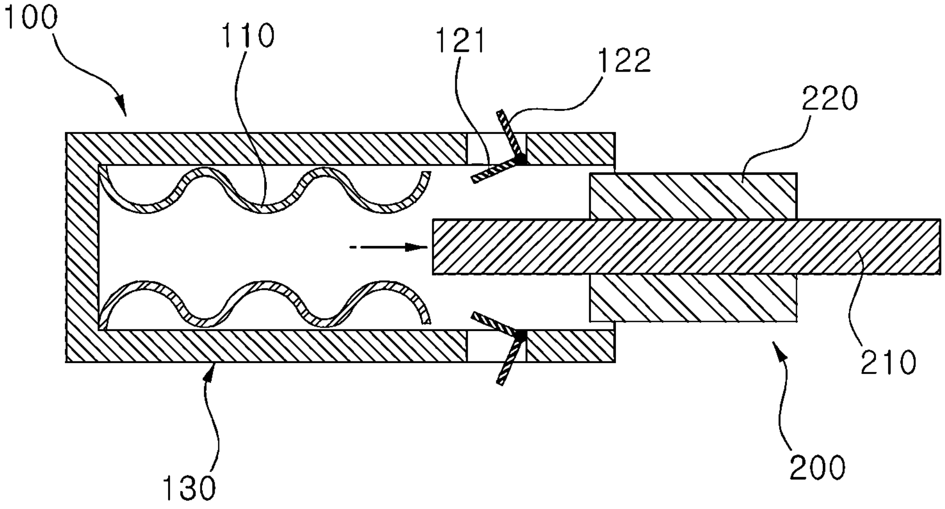

Then, as the female terminal 110 is elastically restored, as shown in FIG. 8, the male connector 200 is automatically reworked. When an external force applied to the release prevention lever 120 is removed, the release prevention lever 120 is also restored to its original position.

As described above, the connector assembly of the present disclosure may prevent causing a poor contact problem after the engagement and may also be easily reworked.

A connector assembly of the present disclosure has a structure that does not cause contact point damage due to durability wear. The connector assembly can also prevent a quality problem related to fretting wear of Sn plating.

When a connector is engaged, a point of contact is possible in a vertical direction instead of a horizontal force. When the connector is inserted into a female pin, the connector is engaged while damaging the Sn plating. Therefore, it is possible to prevent a quality problem by increasing durable contact resistance.

In addition, the simplified structure of the connector assembly enables a copper material having a spring characteristic to be removed, which makes it possible to secure a margin of a design space.

The structure of the connector assembly has many contact points compared to the existing structure. Therefore, even when resistance is decreased, and contact resistance is increased at one point, another contact point can cover a decrease in the resistance and an increase in the contact resistance.

In addition, it is possible to perform reworking without damage to the male/female terminals and to adjust an engagement feeling through a shape and an elastic modulus of an elastic body.

Since a contact pressure and a contact area between the female terminal and the male terminal are increased, the durability of the connector may be increased.

In other words, the structure of the connector assembly has many contact points. Therefore, even when contact resistance of one or two contact points is increased, it is possible to transmit an electrical signal to another contact point.

While the present disclosure has been described with reference to the accompanying drawings and the disclosed embodiments, it should be apparent to those having ordinary skill in the art that various changes and modifications may be made without departing from the spirit and scope of the present disclosure without being limited to the embodiments disclosed herein. Accordingly, it should be noted that such alternations or modifications fall within the claims of the present disclosure, and the scope of the present disclosure should be construed on the basis of the appended claims.

What is claimed is:

1. A connector assembly, comprising:

a female connector having a pair of female terminals inserted into a housing of which one side is open; and a male connector including a male terminal inserted between the pair of female terminals to come into contact with the pair of female terminals, wherein one end of a female terminal of the pair of female terminals is fixed to an inner surface of the housing, wherein another end of the female terminal is disposed to extend toward an open side of the housing, wherein a displacement of the other end occurs toward the one end due to the male connector, wherein the male connector further includes a male terminal guide configured to surround an outer circumference of the male terminal, wherein, when the male connector is inserted into the housing, the male terminal guide presses the other end of the female terminal, and wherein a displacement of the female terminal occurs relative to a central axis of the housing when the male terminal guide presses the other end of the female terminal.

2. The connector assembly of claim 1, wherein, when the male connector is inserted into the housing, the male terminal guide is in surface contact with the other end of the female terminal.

3. The connector assembly of claim 1, wherein the female terminal is a coil spring with peaks and valleys that are connected at regular intervals.

4. The connector assembly of claim 3, wherein, when no external force is applied, an interval between the pair of female terminals is less than or equal to a height difference h between the peaks and the valleys of the female terminal.

5. The connector assembly of claim 3, wherein, when no external force is applied, a width of the male terminal is less than or equal to a height difference h between the peaks and the valleys of the female terminal.

6. The connector assembly of claim 3, wherein, when no external force is applied, a width of the male terminal guide is less than or equal to a height difference h between the peaks and the valleys of the female terminal.

7. The connector assembly of claim 3, wherein a length from an end of the male terminal to the male terminal guide is smaller than a length of the female terminal when no external force is applied.

8. The connector assembly of claim 3, wherein, in a state in which the male connector and the female connector are coupled to one another, an interval between the peaks and the valleys of the female terminal is greater than or equal to ¼ and less than or equal to ½ of an interval between the peak and the valley of the female terminal when no external force is applied.

9. The connector assembly of claim 3, wherein, in a state in which the male connector and the female connector are coupled to one another, a length of the female terminal is less than or equal to ½ of the length of the female terminal when no external force is applied.

10. The connector assembly of claim 3, further comprising:

a release prevention lever, which is hinge-coupled to an inner surface of a lever hole formed in a side surface of the housing and of which an inner portion and an outer portion which form a predetermined angle.

11. The connector assembly of claim 10, wherein the inner portion is disposed in an inner space of the housing when no external force is applied, and wherein, when the male connector is inserted into the housing, the male terminal guide pushes the inner portion to pivot the inner portion.

12. The connector assembly of claim 11, wherein, when the male terminal and the female terminal are engaged, the release prevention lever is restored due to its restoring force to a position of when no external force is applied, and the inner portion blocks the male terminal guide from being moved backward.

13. The connector assembly of claim 12, wherein, when the male terminal and the female terminal are engaged, the outer portion is exposed to an outside of the housing through the lever hole so that a rotational operation of the release prevention lever is performed when the outer portion is manipulated.

14. A connector assembly, comprising:

a female connector having a pair of female terminals inserted into a housing of which one side is open;

a male connector including a male terminal inserted between the pair of female terminals to come into contact with the pair of female terminals, and a male terminal guide configured to surround an outer circumference of the male terminal; and a release prevention lever hinge-coupled to an inner surface of a lever hole formed in a side surface of the housing and configured to prevent the male terminal guide from being moved backward when the male terminal and a female terminal of the pair of female terminals are engaged, wherein one end of the female terminal is fixed to an inner surface of the housing, wherein the other end thereof is disposed to extend toward an open side of the housing, and wherein, when the male connector is inserted into the housing, the male terminal guide presses the other end of the female terminal so that a displacement of the other end occurs toward the one end.

15. The connector assembly of claim 14, wherein a length from an end of the male terminal to the male terminal guide is smaller than a length of the female terminal when no external force is applied.

16. The connector assembly of claim 15, wherein, when the male terminal and the female terminal are engaged, the length of the female terminal is less than or equal to ½ of a length of the female terminal when no external force is applied.

17. The connector assembly of claim 14, wherein the release prevention lever includes:

an inner portion of which one end portion is disposed in an inner space of the housing and coupled to a lever pin coupled to an inner surface of the lever hole when no external force is applied; and an outer portion, which maintains a predetermined angle with the inner portion and of which one end portion is coupled to the lever pin, wherein the release prevention lever is pivoted about the lever pin and is elastically restored due to an elastic spring coupled in the housing.

* * * * *